March 31, 1959  J. W. McCOLL  2,879,870
COMPOUND THERMOSTATIC ELEMENT
Filed May 22, 1957
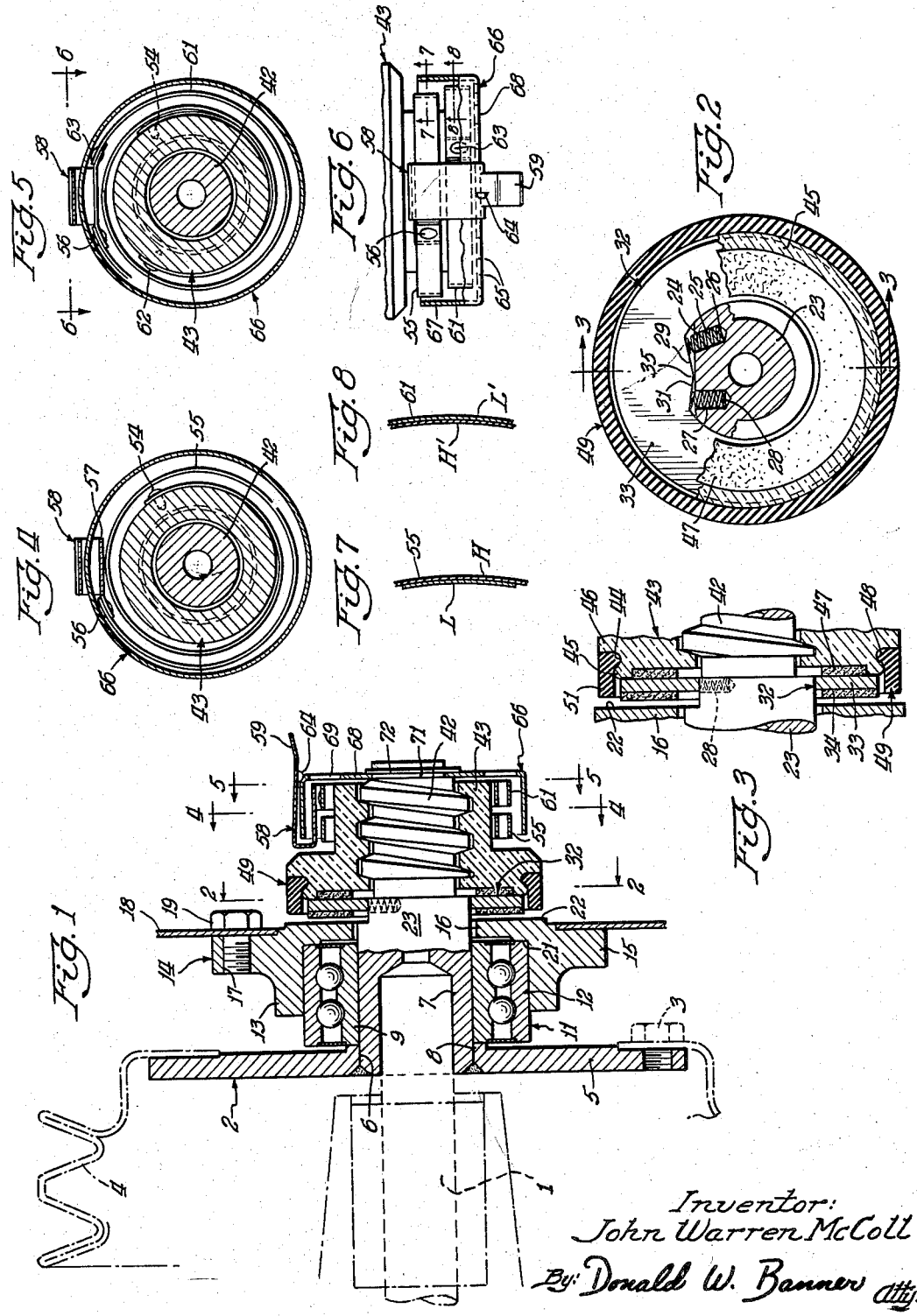
Inventor:
John Warren McColl
By: Donald W. Banner Atty.

United States Patent Office 2,879,870
Patented Mar. 31, 1959

2,879,870

COMPOUND THERMOSTATIC ELEMENT

John Warren McColl, Melrose Park, Ill., assignor to Borg-Warner Corporation, a corporation of Illinois Application May 22, 1957, Serial No. 660,831

8 Claims. (Cl. 192—82)

This invention relates to compound thermostatically responsive devices, and more particularly to devices including thermally responsive means adapted to effect relative rotation between a pair of elements which are themselves rotatable.

One object of the present invention, therefore, is the provision of a new and improved thermally actuating mechanism which comprises a pair of coiled members connected between common points, including thermally responsive means.

Another object of the present invention is the provision of a device in accordance with the preceding object in which the thermally responsive means comprise a pair of reversely coiled bimetallic elements, the high and low expansion sides thereof being respectively reversed.

Another object is the provision of a device in accordance with the preceding objects in which the pair of bimetallic elements have different centrifugally responsive characteristics.

Another object of the present invention is the provision of a device in accordance with the preceding objects in which each bimetallic element has an end connected to a first part and a second end connected to a second part, the first part being movable manually relative to the second part.

Another object is the provision of a device in accordance with the preceding objects in which the thermally responsive means control a clutch adapted to effect engagement and disengagement of vehicle automotive fan.

Other objects and features of the invention will be readily apparent to those skilled in the art from the specification and appended drawings illustrating certain preferred embodiments in which:

Figure 1 is a longitudinal sectional view, with parts broken away, of a device constructed in accordance with the principles of the present invention;

Figure 2 is an enlarged sectional view along the plane of line 2—2 of Figure 1;

Figure 3 is a partial sectional view along the plane of line 3—3 of Figure 2;

Figure 4 is a sectional view along the plane of line 4—4 of Figure 1;

Figure 5 is a sectional view along the plane of line 5—5 of Figure 1;

Figure 6 is a sectional view along the plane of line 6—6 of Figure 5;

Figure 7 is a sectional view along the plane of line 7—7 of Figure 6;

Figure 8 is a sectional view along the plane of line 8—8 of Figure 6.

In the figures there is disclosed a device constructed in accordance with the principles of the present invention disposed in a typical automotive environment. There is illustrated a shaft 1 adapted to drive the water pump (not shown) of the vehicle, which is fixedly attached to a generally annular drive member 2, T-shaped in cross section, which is connected by bolts 3 to a pulley 4 conventionally driven by the fan belt of the vehicle. The member 2 comprises a generally annular plate 5 of steel or other suitable material having a central, circular opening 6 therein through which extends a drive part 7 having a circular outer periphery disposed within the opening 6, part 7 being also preferably made of steel and welded or otherwise fixedly joined to plate 5 and provided with a driving connection to the shaft 1. It will therefore be seen that all times during the period of rotation of the pulley 4 by the fan belt, the plate 5 and the drive part 7 will be continually rotated, and effect consequent continual rotation of the shaft 1 and the water pump connected thereto.

Plate 5 has a central, annular flange portion 8 against which is disposed the inner, annular race 9 of a double row radial thrust ball bearing 11, race 9 being seated on a complementary annular peripheral portion of the drive part 7. The bearing 11 is further provided with an outer annular race 12 upon which is seated a horizontally extending portion 13 of a fan carrier 14. Carrier 14 is generally annular in configuration, and has the cross sectional shape illustrated in Figure 1. Projecting radially outwardly from the portion 13 is an annular outer portion 15, and projecting radially inwardly from the portion 13 is an annular portion 16. The outer portion 15 is provided with a plurality of circumferentially spaced, threaded openings 17; as illustrated in Figure 1, the carrier 14 is adapted for carrying an automotive fan 18 which has a central, circular opening therein seated upon the outer surface of portion 13 and having circumferentially spaced openings therein through which bolts 19 extend respectively, the inner threaded portions of bolts 19 being received in the threaded, complementary portions of the openings 17 so that the fan 18 is fixedly mounted to the carrier 14. Carrier 14 is prevented from rearward axial movement by the inner, annular surface 21 on the portion 16 of carrier 14, the surface 21 extending radially and being disposed in engagement with the race 12 of the bearing 11. Portion 16 is further provided with a forwardly facing, radially extending surface 22, parallel to the surface 21 which, as will be more fully described hereinafter, serves as an annular clutch surface. The carrier 14 is preferably formed of a material such as cast iron to ensure the effectiveness of this clutch surface.

The drive part 7, immediately forwardly (to the right in Figure 1) of the portion thereof surrounded by the carrier 14, is provided with a portion 23 of cross section best illustrated in Figure 2. This portion 23 has a generally circular outer periphery interrupted by a flat surface 24. Through surface 23 there is drilled a first opening 25, projecting at an angle of approximately 20° with respect to a perpendicular to surface 24, opening 25 receiving a coiled compression spring 26 which normally projects outwardly beyond the end of opening 25. Through surface 24 there is also drilled a second opening 27, perpendicular to surface 24, which receives a coiled compression spring 28 which also extends outwardly beyond the plane of surface 24, but to a lesser extent than does spring 26. Springs 26 and 28 are so chosen that the former supplies a substantially less biasing force than the latter, preferably being of the order of three to one. In the normal disengaged condition of the device illustrated in Figure 2, springs 26 and 28 extend outwardly from their respective openings and into respective engagement with flat surfaces 29 and 31 formed on a clutch plate indicated in general by the number 32. The clutch plate 32 consists of a generally annular steel backing member 33 which carries on its rearwardly facing surface (to the left in Figures 1 and 3) an annular facing 34 of friction material glued or otherwise rigidly mounted to the backing member 33. A typical example of a suitable material is the brake lining sold by the Gatke Corporation under the designation style No. 2460. The central portion of the backing member 33 is provided with an opening of the configuration best illustrated in Figure 2, this opening being generally circular throughout the major portion thereof and in complementary engagement with the outer periphery of portion 23, this generally circular portion terminating in the before described surfaces 29 and 31. These surfaces 29 and 31 extend radially inwardly to meet along a common line 35, in engagement with the surface 24. Surfaces 29 and 31 are so formed that when the clutch plate 32 is positioned such that these surfaces diverge radially outwardly equal amounts from a horizontally extending plane through the line 35, each of these surfaces will define an angle of approximately 10 degrees with that horizontal. As will be seen from Figure 2, however, in the normal disengaged condition of the device, springs 26 and 28 will position the clutch plate 32 such that the surface 29 thereon defines an angle of approximately 15 degrees with the horizontal surface 24, while the surface 31 on the clutch plate defines an angle of approximately 5 degrees with the horizontal surface 24. Inasmuch as the springs 26 and 28 are of unequal biasing force, it manifestly is necessary, in order to achieve this particular positioning of the clutch plate 32, to make weaker spring 26 project beyond the surface 24 in the normal relaxed condition of that spring more than stronger spring 28 projects beyond surface 24 in the normal relaxed position thereof.

Immediately forwardly of the portion 23, the drive part 7 is provided with an externally threaded portion 42. This portion 42 is preferably provided with Acme standard 29 degree stub threads, three threads per inch, the threads being left hand threads. Carried by this threaded portion 42 is a generally annular nut 43 having internal threads complementary to those provided on the threaded portion 42 of the drive part 7. Nut 43 preferably is formed of a phenolic resin moulded to have the Acme left hand threads provided on an interior opening therein, and if desired a bronze powder may be incorporated in the phenolic resin material prior to molding which will act as a mild lubricant to lower the coefficient of friction of the phenolic resin. Nut 43 is also molded so as to have annular recess 44 therein between portions 45 and 46 thereon of different diameters, as shown in Figure 3. The rearmost face (to the left in Figures 1 and 3) of nut 43 is provided with a circular, shallow groove in which is disposed an annular facing 47 of friction material similar to that of the facing 34, the facing 47 being glued or otherwise rigidly mounted to the nut 43. Disposed within the recess 44 is a flanged portion 48 of an annular buffer 49 which comprises a neoprene rubber body 51. The buffer 49 is initially constructed such that the annular flange 48 on the body 51 is of substantially smaller diameter than that of the remainder of the body 51; when the buffer 49, therefore, is snapped into the position illustrated in Figure 3, the diameter of the flanged portion 48 thereof if stretched outwardly so that the buffer 49 is under tension and will not, therefore, rotate relative to the nut 43. In this assembled position with the nut 43, it will be seen that the buffer 49 overlies a portion of the clutch plate 32.

The forwardmost portion of the nut 43 is annular in configuration and of relatively reduced diameter and fixedly attached thereto by suitable means, such as a rivet 54, is one end of a spirally wound bimetal 55. The opposite end of bimetal 55 is fixedly connected by a suitable rivet 56 to an extension provided on the inner leg 57 of a generally U-shaped clip 58 which has an outer, longer leg 59. Axially outwardly from the bimetal 55 is a second coiled bimetal 61, one end of which is fixedly attached to the nut 43 by means such as a rivet 62, the opposite end of bimetal 61 also being fixedly attached to the extension of the leg 57 on the clip 58 by suitable means, such as a rivet 63. Bimetals 55 and 61 are, therefore, both attached to the nut 43 and to the clip 58; these bimetals are, however, coiled in opposite directions as clearly indicated in Figures 4 and 5. Furthermore, bimetal 55 has the high expansion side thereof to the right, in the view of Figure 7, the high expansion side being designated by the letter H, while the low expansion side is designated by the letter L. Conversely, bimetal 61 has the high expansion side thereof to the left in Figure 8, its high expansion side being designated by the letter H' in Figure 8, while its low expansion side is designated by the letter L'. Stated in other words, the bimetals 55 and 61 are not only wound in opposite directions but, in addition, their respective high and low expansion sides are reversed.

Clip 58 has an integral detent 64 projecting inwardly from the inner surface of leg 59 which is received between a pair of a plurality of serrations 65 formed on an outer surface of a generally cup shaped member 66 which comprises an axially extending annular portion 67 and a forwardly facing, radially extending portion 68. As best illustrated in Figure 1, the clip 58 embraces and is carried by the portion 67 of the cup 66. The radially extending portion 68 of the cup 66 is provided with a plurality of circumferentially spaced openings 69 through which heated air from the radiator—or other portions—of the vehicle in which a device incorporating the present invention may pass to contact the bimetals 55 and 61. Cup 66 is also provided with a central opening generally circular in configuration but provided with a flat side, this opening being engaged with a complementary shaped portion 71 at the most forward part of the drive part 7 so that the cup 66 is prevented from rotating relative to the drive part 7. A bowed snap ring 72 is provided in a suitable slot in the portion 71 of the drive part 7 to prevent vibration of cup 66 and forward axial movement thereof relative to the drive part 7, the inner wall of the radially extending portion 68 of the cup 66 being disposed in engagement with a shoulder being formed on the drive part 7 whereby rearward axial movement of the cup 66 is also prevented.

It should be understood that the device illustrated in the figures is mounted in an automotive vehicle so that the forward end of the drive part 7 (the right end in the view of Figure 1) is adjacent the rear surface of the vehicle radiator. Air passing through the radiator will, of course, be heated, and as previously explained will pass through the openings 69 in the cup 66 so that the bimetals 55 and 61 will operate in response to this heated air. These bimetals are so constructed and arranged that they bias the nut 43 toward the position illustrated in the figures when the temperatures of these bimetals is sufficiently low. Under these conditions, when the fan belt drives the pulley 4, the drive part 7 and the shaft 1—and therefore the water pump—will be continuously rotated. The nut 43, the cup 66, bimetals 55 and 61, and the clutch plate 32, will also be rotated, spring 28 being sufficiently strong to hold the clutch plate 32 in substantially the position relative to the drive part 7 illustrated in Figure 2. In a normal automotive installation, the direction of this rotation is clockwise when viewed from the front of the vehicle. Under these conditions, the fan carrier 14 will not be driven with the drive part 7, but will rotate in the same direction as the drive part 7, but at a slower speed, this rotation resulting from the bearing drag and from the pitch of the fan blades 18 connected to the carrier 14 when the vehicle is moving forwardly. Obviously the carrier 14 is absorbing no power under these conditions from the engine of the vehicle.

It should be noted that bimetals 55 and 61 are connected, in effect, between the drive part 7 and the nut 43; as a result of their orientation, both bimetals 55 and 61 will tend to rotate the nut 43 in a counterclockwise direction (when viewed from the front of the device which is to the right in Figure 1) when these bimetals are heated. Inasmuch as the threads on the nut 43 and the portion 42 of the drive part 7 are "left hand" threads, this will effect axial movement of the nut 43 rearwardly (to the left in Figure 1). This will force rearward movement of the clutch plate 32 so that the friction facing 34 thereon engages the clutch face 22 on the fan carrier 14. As previously described, the fan carrier 14 at this instant will be rotating in the same direction relative to the drive part 7 as is the nut 43; the difference in rotation speeds between the fan carrier 14 and the drive part 7 is greater than the rotation speed difference between the nut 43 and the drive part 7. As a result, when the clutch plate 32 engages the fan carrier 14, clutch plate 32 will be rotated against the bias of spring 28 through an arc of approximately 5 degrees until the surfaces 31 and 24 are in engagement. Because of the frictional contact between clutch plate 32 and friction facing 47 on the nut 43, the nut 43 will be further rotated in the same direction relative to the drive part 7 as was imparted to it by the bimetals 55 and 61. The net result of these interactions is a self-energizing effect on the nut 43, due to the tendency of the fan to lag so that the nut 43 tightly clamps the clutch plate 32 into tight frictional engagement with the fan carrier 14. The carrier 14, and the fan blades 18 connected thereto, will therefore be directly driven from the drive part 7 through the clutch plate 2. The fan will then be driven from the vehicle engine in the customary fashion.

This relationship will continue until the occurrence of two conditions. More specifically, as the heated air which passes through the vehicle radiator decreases in temperature, the temperature of bimetals 55 and 61 will also decrease. As the bimetals are cooled, they tend to move the nut 43 forwardly (to the right in Figures 2 and 4). It will be apparent, however, that the fan 18 will tend to lag behind the drive part 7, and that the friction between the clutch surface 22 on the fan carrier 14 and the clutch plate 32—and the friction between the clutch plate 32 and the friction facing 47 on the nut 43—will tend to keep the nut 43 in its rearward, "locked up" condition. This force is greatly in excess of that applied by the bimetals, and as a result the fan 18 will continue to be driven from the drive part 7 as long as speed of the drive part 7 exceeds that of the fan. When the drive part 7, however, has its rotative speed reduced suddenly—as for example when the driver of the vehicle permits its accelerator to move from a substantially depressed position to a substantially released position—the inertia of the fan 18 is such that the carrier 14 will overrun the drive part 7. Keeping in mind the frictional engagement between the carrier 14, the clutch plate 32, and the nut 43, it will be seen that this overrunning action of the carrier 14 will effect rotation of the clutch plate 32 in a clockwise direction, in the view of Figure 3, against the bias of the weak spring 26, this movement being assisted in some degree by the spring 28. Clutch plate 32 will rotate relatively freely throughout the lost motion movement permitted to it by the aforementioned space between the flat surface 24 on the drive part 7 and the flat surface 29 on the clutch plate 32. Because of the frictional engagement between the clutch plate 32 and the friction facing 47 on the nut 43, nut 43 will also be rotated freely with the clutch plate 32. It is significant to note that the direction of this rotation of the nut 43 is such as to effect its movement to the right in Figures 2 and 4, permitting the clutch plate 32 to move away from the clutch surface 22 on the carrier 14. Inasmuch as it has been assumed that bimetals 55 and 61 are now relatively cool, the force which they apply to the nut 43 will tend to continue its movement away from the carrier 14 until the parts assumes the position assumed in Figures 2 and 4. As soon as the frictional engagement between the clutch plate 32 and the carrier 14 is broken, the springs 26 and 28 will return the clutch plate 32 to the position illustrated in Figure 3, clutch plate 32 being held poised intermediate its two rotative limits. It will be apparent that this unlocking action is rapidly and effectively accomplished by virtue of the lost motion connection between the clutch plate 32 and the drive part 7, the bias applied to the clutch plate 32 by the spring 28 and the friction engagement between the clutch plate 32 and the nut 43.

Assuming that the bimetals 55 and 61 should again be heated by the air coming from the vehicle radiator—or from any other source—the aforedescribed cycle will be repeated; the nut 43 will be moved to the left in Figures 2 and 4 until the clutch plate 32 engages the carrier 14, nut 43 then being moved further to the left once again to tightly lock the parts together whereby a drive is effected by the drive part 7 and the fan 18. It should be noted that while the bimetals remain heated, no matter how rapidly the speed of the drive part 7 is decreased to effect a momentary overrunning condition of the carrier 14, although the clutch plate 32 may momentarily effect a forward movement of the nut 43 as a result of this overrunning of the carrier 14, the force of the bimetals 55 and 61 will immediately re-effect engagement of the clutch plate 32 with the carrier 14 to re-establish the drive from drive part 7 to the fan 18 almost instantaneously.

It should be noted that, as described above, because the bimetals 55 and 61 are coiled in opposite directions and have their high and low expansion sides reversed, their thermal reactions will be additive. In other words, upon an increase in the temperature of these bimetals they will both act to rotate the nut 43, the force applied to that nut by the bimetals being in the same direction. Conversely, if the bimetals 55 and 61 are of equal mass and equal mass distribution, the force applied by the bimetal 55 to the nut 43 which is due to centrifugal force is opposite in direction and equal to the force applied by the bimetal 61 to the nut 43 due to centrifugal force; under this condition, therefore, the centrifugal forces applied to nut 43 by the two bimetals will be equal and in opposite directions so as to nullify each other, and the nut 43 will be prevented from any "creep" resulting from centrifugally induced forces on the bimetals.

It is not, of course, necessary that two bimetals be employed in order to achieve this centrifugal nullification effect. Either one of the bimetals could be replaced by a member coiled in the same manner as the bimetal which it replaces, and of the same mass and mass distribution as that of the remaining bimetal. Under this circumstance, however, the strength of the bimetal which remains, or in other words the thermal reactiveness of the bimetal which remains, should preferably be greater than is necessary in the case of the two bimetals inasmuch as the single, remaining bimetal must overcome any opposing bias applied to the nut 43 which is in a direction opposite to the direction of rotation imparted to the nut by this remaining bimetal.

It also will be apparent to those skilled in the art that under some circumstances it may be desirable to employ two bimetals which are of different masses. For example, it is well known that the air which passes through the vehicle radiator is heated to a greater degree for given engine ambient conditions when the vehicle is moving slowly than in the case in which the vehicle is moving very rapidly. Therefore, if it is desired to reduce the amount of thermally induced force necessary to lock up the clutch at a high vehicle speed below that necessary to lock up the clutch at a low vehicle speed, the mass of bimetal 61 may be made slightly greater than the mass of bimetal 55. Under this circumstance, when the engine speed is high, the speed of drive part 7 will also be high; at such high speed the centrifugal effect of bimetal 61 on nut 43 will be sufficiently greater than the centrifugal effect of bimetal 55 on the nut 43 to result in rotation of nut 43 in a direction to effect axial movement thereof toward the fan carrier 14. The bimetals 55 and 61 will then be able to lock up the clutch at a lower bimetal temperature than in the case when the nut 43 occupied its normal position. In other words, the nut 43 will have been moved centrifugally part of the distance required for it to lock up the clutch. The masses of bimetals 55 and 61 may be readily balanced by those skilled in the art to achieve the precise centrifugal effect—if any—on the nut 43 which is desired.

It should further be noted that clip 58, attached to one end of both of the bimetals 55 and 61, may be placed in a variety of positions relative to the cup 66. The detent 64 will hold the clip 58 in any position in which it is placed relative to the cup 66. As clip 58 is moved from one position relative to the cup 66 to another position, it will obviously move the ends of the bimetals 55 and 61 attached thereto. The bimetals therefore will act as force transmitting members, transferring movement of the clip 58 to the nut 43. In other words, as the clip 58 is moved relative to the cup 66, nut 43 will be rotated to the desired position relative to the drive part 7. This will obviously affect the ambient temperature at which the bimetals 55 and 61 effect sufficient rearward movement of the nut 43 to "lock up" the clutch.

It is important to notice that the present invention provides for complete neutralization of the centrifugal effect of the thermally responsive members on the nut. Correspondingly, any other particular centrifugally responsive effect which is desirable may be imparted to the nut. These features may be achieved with a pair of bimetals, or with only one bimetal associated with another coiled member as previously described. Preferably, however, two bimetals are used; and as another feature of this invention they are not only coiled reversely but also reversed with regard to their respective high and low expansion sides whereby the thermal effect of these two bimetals are additive and complementary.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

I claim:

1. In a thermally actuated device adapted for mounting upon a rotatable member, a pair of relatively axially and rotatably movable clutch means adapted for mounting upon the rotatable member, and thermally responsive means adapted for mounting upon the rotatable member comprising a pair of reversely coiled members, means connecting both of said coiled members to one of said clutch means effective to impart rotary movement thereto upon the occurrence of thermal variations sufficient to effect said thermally responsive means, an element adapted to rotate with the rotatable member, and means connecting both of said coiled members to said element movable to vary simultaneously the tension of said coiled members.

2. The device defined in claim 1 in which at least one of said pair of coiled members is formed of bimetallic material.

3. The device defined in claim 1 in which both of said pair of reversely coiled members are of bimetallic material, and in which the high and low expansion sides of the coils are reversed.

4. The device defined in claim 2 in which said element adapted to rotate with the rotatable member comprises a perforated cup, and in which said means connecting both of said coiled members to said element comprises a device adjustably positionable upon said cup whereby the initial tension on said coiled members may be varied.

5. The device defined in claim 2 in which the mass of one of said coiled members differs from that of the other of said coiled members.

6. The device defined in claim 3 in which said element adapted to rotate with the rotatable member comprises a perforated cup, and in which said means connecting both of said coiled members to said element comprises a device adjustably positionable upon said cup whereby the initial tension on said coiled members may be varied.

7. The device defined in claim 3 in which the mass of one of said coiled members differs from that of the other of said coiled members.

8. In a thermally actuated fan control device adapted for mounting upon a rotatable shaft, clutch means comprising a plurality of relatively axially and rotatably movable members adapted for mounting upon the shaft and relatively movable to a first position to effect a drive from the shaft to a fan device assoicated therewith, and thermally responsive means adapted for mounting upon the shaft comprising a pair of reversely coiled members of thermally responsive material, means connecting both of said coiled members to one of said plurality of movable clutch members effective to impart rotary movement thereto upon the occurrence of thermal variations sufficient to effect said thermally responsive means, an element adapted to rotate with the shaft, and means connecting both of said coiled members to said element movable to vary simultaneously the tension of said coiled members.

References Cited in the file of this patent

UNITED STATES PATENTS

| | | |
|---|---|---|
| 1,292,991 | Barstow | Feb. 4, 1919 |
| 1,544,549 | Barnett | July 7, 1925 |
| 1,752,362 | Barstow | Apr. 1, 1930 |
| 2,005,468 | Modine | June 18, 1935 |